(12) United States Patent
Fritzsche et al.

(10) Patent No.: US 9,751,701 B2
(45) Date of Patent: Sep. 5, 2017

(54) STORAGE DEVICE FOR STACKABLE CONTAINERS

(71) Applicant: SIEMENS AKTIENGESELLSCHAFT, Munich (DE)

(72) Inventors: Roland Fritzsche, Nuremberg (DE); Maik Wesemeier, Dahlenwarsleben (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/913,738

(22) PCT Filed: Aug. 19, 2014

(86) PCT No.: PCT/EP2014/067661
§ 371 (c)(1),
(2) Date: Feb. 23, 2016

(87) PCT Pub. No.: WO2015/024935
PCT Pub. Date: Feb. 26, 2015

(65) Prior Publication Data
US 2016/0200527 A1    Jul. 14, 2016

(30) Foreign Application Priority Data
Aug. 23, 2013 (DE) .......................... 10 2013 216 823

(51) Int. Cl.
*B65G 57/16* (2006.01)
*B65G 57/03* (2006.01)
(Continued)

(52) U.S. Cl.
CPC ............ *B65G 57/035* (2013.01); *B64F 1/368* (2013.01); *B65G 37/00* (2013.01); *B65G 43/10* (2013.01);
(Continued)

(58) Field of Classification Search
CPC .......... B65G 1/0464; B65G 1/06; B65G 1/10; B65G 37/00; B65G 43/10; B65G 47/52;
(Continued)

(56) References Cited

U.S. PATENT DOCUMENTS 3,776,395 A * 12/1973 Lingg .................... B64F 1/368
                                                        198/465.2
3,933,254 A    1/1976 Pulver et al.
(Continued)

FOREIGN PATENT DOCUMENTS

CN        1077174 A    10/1993
CN      103209896 A     1/2013
(Continued)

*Primary Examiner* — Mark Beauchaine
(74) *Attorney, Agent, or Firm* — Laurence Greenberg; Werner Stemer; Ralph Locher

(57) ABSTRACT

A storage device for stackable containers for conveying items, in particular items of luggage in a sorting conveyor system in an airport, includes a lifting conveyor with a container receiving device which can be guided between upper and lower conveying planes for storing at least one container. A conveyor is disposed in the upper conveyor plane for guiding storage containers to a transfer position and a discharge conveyor is disposed in the upper conveyor plane for discharging stored containers from a transfer position. A moving device moves a container from the transfer position to the empty container receiving device or to a container placed on the uppermost part of the container receiving device and moves the most upper container placed on the container receiving device to the transfer position. As a result, empty containers can be received, housed and guided back in a simple and cost effective manner.

8 Claims, 5 Drawing Sheets

(51) Int. Cl.
*B65G 60/00* (2006.01)
*B65G 37/00* (2006.01)
*B65G 43/10* (2006.01)
*B65G 47/52* (2006.01)
*B64F 1/36* (2017.01)
*B65G 47/51* (2006.01)

(52) U.S. Cl.
CPC ......... *B65G 47/5181* (2013.01); *B65G 47/52* (2013.01); *B65G 60/00* (2013.01); *B65G 2201/0258* (2013.01)

(58) Field of Classification Search
CPC ...... B65G 49/00; B65G 57/02; B65G 57/026; B65G 57/035
See application file for complete search history.

(56) References Cited

U.S. PATENT DOCUMENTS

| | | | |
|---|---|---|---|
| 4,029,714 A | 6/1977 | Ziegenhagen et al. | |
| 5,310,307 A | 5/1994 | VanderMeer et al. | |
| 5,882,174 A * | 3/1999 | Woerner | B65G 65/00 414/788.7 |
| 6,152,678 A * | 11/2000 | King | B23Q 7/005 414/749.5 |
| 6,789,660 B1 | 9/2004 | Bruun et al. | |
| 2013/0211864 A1 | 8/2013 | Sanderson et al. | |
| 2013/0302118 A1 | 11/2013 | Kleber | |

FOREIGN PATENT DOCUMENTS

| | | | |
|---|---|---|---|
| DE | 2138120 A1 | 2/1973 | |
| DE | 7538625 U | 3/1978 | |
| DE | 2702219 A1 | 7/1978 | |
| DE | 2815459 A1 | 10/1979 | |
| DE | 3221324 A1 | 11/1983 | |
| DE | 3416928 A1 | 11/1985 | |
| DE | 256 495 A1 * | 5/1988 | ............ B65G 60/00 |
| DE | 256495 A1 | 5/1988 | |
| DE | 69917028 T2 | 7/2005 | |
| EP | 0610780 A1 | 8/1994 | |
| EP | 1091895 A1 | 4/2001 | |
| GB | 933094 | 8/1963 | |
| WO | 9967160 A1 | 12/1999 | |
| WO | 2012097525 A1 | 7/2012 | |

* cited by examiner

STORAGE DEVICE FOR STACKABLE CONTAINERS

BACKGROUND OF THE INVENTION

Field of the Invention:

The invention relates to a storage device for stackable containers for conveying items, in particular items of luggage, in a sorting conveyor system in an airport.

Items of luggage deposited at departure desks of an airport are conveyed by means of a sorting conveyor system to sorting end points, at which vehicles are loaded with items of luggage for specific aircraft. As a rule in such cases the items of luggage generally cover quite large distance on an automated conveyor system between check-in point and sorting end point. In large sorting conveyor systems the items of luggage are transported individually on a tray-shaped container in each case. At the sorting end points the items of luggage are separated from the containers, which are then taken back and may have to be stored before being loaded with new items of luggage. Now the demand for containers in the sorting conveyor system is often different, high in the morning and the evening for example, while being low at midday and during the night. The problem arising as a result of these peak loads of an airport is that, when demand is low, a large number of empty containers are transported unused in the sorting conveyor system, or with short-term high demand there are not sufficient empty containers available for loading, since these are in transit in the sorting conveyor system.

A device for stacking and unstacking containers is known from publication DE 34 16 928 A1. The device consists of a stand which bears a pair of cantilever arms for each stack so that the container-specific carrying elements clamped onto them and therefore rapidly exchangeable carry the lowest container of the stack at its upper edge. Attached below the stacks is a transverse conveyor, generally embodied as a chain roller conveyor, which connects all stacks to one another and which simultaneously serves as a lifting frame for simultaneously operating all stacks. The lifting frame is guided with known guide devices in the stand and is raised and lowered with likewise known spindle drives. The operation of the stack from below makes a small height of the device possible as well as enabling material to flow through below the stacks.

The translation DE 699 17 028 T2 of the European Patent document EP 1 091 895 B1 discloses a transport system for transporting items such as for example luggage at an airport, in which a congestion device for storing and pre-sorting at least a part of the flow of items through the system is provided. Each item has a storage device, which conveys at least one object. The transport system has a first conveyor for transporting items from the loading station to an item storage arrangement and a second conveyor for transporting items from the item storage arrangement to the unloading station. The item storage arrangement has a number of storage units. Each storage unit has a storage section defined by a frame rack of a storage frame, which is inclined in the direction of its front end and has steel rollers on which the storage devices can slide. Each storage unit further has a loading unit for loading storage devices into the storage section and unloading storage devices from the storage section and for moving storage devices along the front end of a horizontal plane of the storage section. Between the horizontal planes the storage devices are moved by two lifts, wherein one lift for loading storage containers is arranged on one side of the frame rack and the other lift for unloading storage containers from the frame rack is arranged on its opposite side. The lifts are essentially placed in the same vertical plane as the loading units.

The disadvantage of the known devices is that they operate slowly and they are expensive.

BRIEF SUMMARY OF THE INVENTION

The underlying object of the invention is therefore to provide a storage device for containers which, in a simple manner, can receive empty containers quickly and cost effectively, store them and guide them back.

In accordance with the invention the object is achieved by a storage device for stackable containers for conveying individual items, in particular items of luggage, in a sorting conveyor of an airport, as described below.

Accordingly the storage device comprises a lifting conveyor with a container receiving device, for storing at least one container, which can be guided between an upper receiving plane and a lower receiving plane. In such cases the storage device can involve precisely one lower conveyor plane but also a number of lower conveyor planes arranged above one another. The storage device also comprises a feed conveyor, which is arranged in the upper conveyor plane, for guiding storage containers to be stored up to a receiving position and a discharge conveyor, which is arranged in the upper conveyor plane, for guiding containers from a transfer position. The storage device further comprises a moving device for moving a container from the receiving position onto the empty container receiving device or onto the container placed on the respective uppermost part of the container receiving device and for moving the container placed on the respective uppermost part of the container receiving device into the transfer position. By separating the transport of individual containers in the upper conveyor plane and the transport of a number of stacked containers in the lower conveyor plane or in the upper conveyor plane, movements can be saved or made in parallel, so that the stacking and unstacking can be handled more easily and more quickly. A complete lifting of container stacks for inserting or withdrawing containers is dispensed with. The storage device gains extra performance, with a moderate increase in costs compared to known solutions.

In an advantageous form of embodiment of the inventive storage device the container receiving device has a transverse conveyor, by means of which, on the lower conveyor plane, a container stack of stored containers is able to be transferred from the container receiving device to transport means or is able to be received from said means. The transverse conveying direction is aligned transverse to the lifting conveyor direction and can lie both in parallel and also perpendicular to the conveying direction in the upper conveyor plane. This enables container stacks which have a predetermined number of containers to be extracted decoupled from the transport of individual containers on the upper conveyor plane. In this case the transverse conveyor can advantageously be embodied reversibly. The transport means can be arranged at both ends of the transverse conveyor, so that container stacks can optionally be received or transferred on both sides of the transverse conveyor.

In a preferred form of embodiment of the inventive storage device the transport means is embodied as a reversible buffer conveyor for dynamic storage of container stacks. Container stacks to be stored are guided in turn to the buffer conveyor, wherein, if empty containers are needed, the last container stack buffered in each case is guided back to the lifting conveyor as the first stack.

In a likewise preferred form of embodiment of the inventive storage device the transport means is embodied as a transport vehicle for transporting stacks of containers between the lifting conveyor and a stationary container buffer. The transport vehicle embodied as a distributor truck conveys stacks of containers to trestles, which serve as stationary container buffers, for example.

In an advantageous embodiment of the inventive storage device a container is able to be transported without a moving device between receiving position and transfer position by means of the transverse conveyor on the upper conveying plane. This makes it possible to transport a container which is not to be stored from the feed conveyor to the discharge conveyor continuously and thus more rapidly.

In a preferred form of embodiment of the inventive storage device the containers are embodied reversibly and the discharge conveyor is formed by the feed conveyor and also the transfer position by the receiving position. This advantageously allows savings to be made on separate feed conveyors and discharge conveyors and for them to be formed by a single conveyor for feeding and discharging.

In a further advantageous form of embodiment of the inventive storage device the moving device is embodied as a carriage able to be moved in parallel to the upper conveyor plane with controllable gripper elements which, in order to move a container, are able to be engaged with said container. The carriage can be moved by a conveying system, for example by a belt drive. The gripper elements are adapted to the outer shape of the container and lift the container up slightly when closing and lower it again when opening.

In a further preferred embodiment the inventive storage device comprises a control device for controlling the container receiving device of the lifting container, which is configured such that the container receiving device, for moving a container, is moved upwards from the receiving position far enough for the container gripped by the movement device to be deposited on the empty container receiving device or to be stacked on the uppermost container deposited on it. In this way a further container can be positioned for storage without gripper elements and container colliding. The uppermost container of the stack is located in a waiting position directly below the upper conveying plane.

Preferably the control device of the inventive storage device is further configured so that the container receiving device, for moving the uppermost container stored on it to the transfer position, is moved far enough upwards for the uppermost container to be able to be gripped by the moving device.

BRIEF DESCRIPTION OF THE SEVERAL VIEWS OF THE DRAWING

Further features and advantages of the inventive storage device emerge from the description given below, which relates to the drawings, in which, in schematic diagrams.

DESCRIPTION OF THE INVENTION

Figure 1:
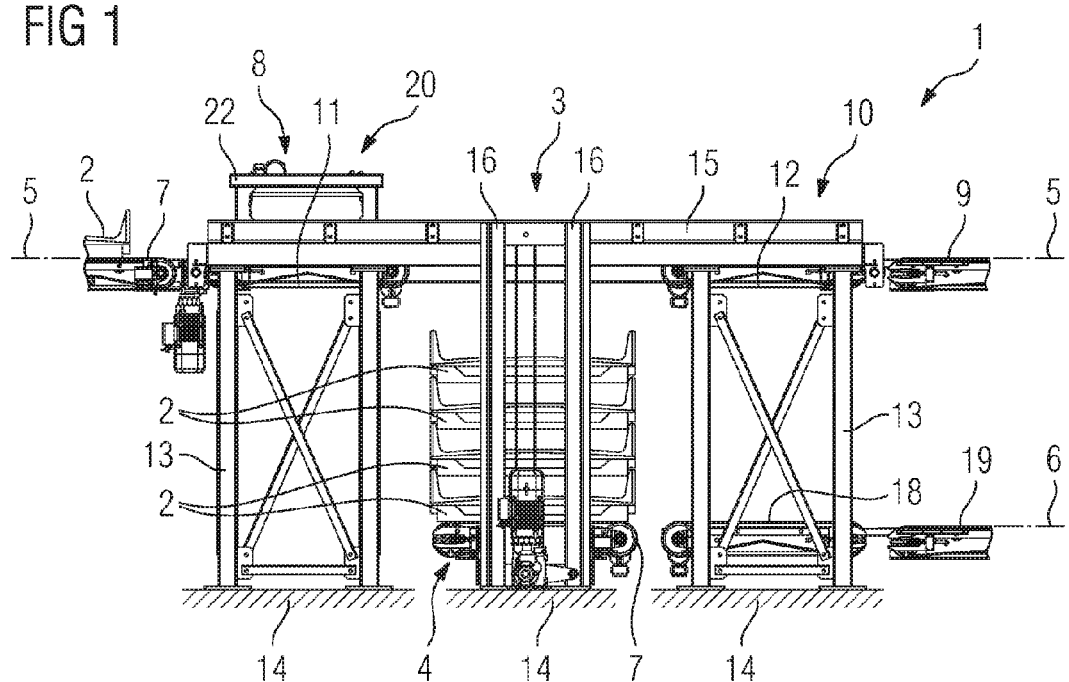
FIG. 1 shows an inventive storage device in a side view.
Figure 2:
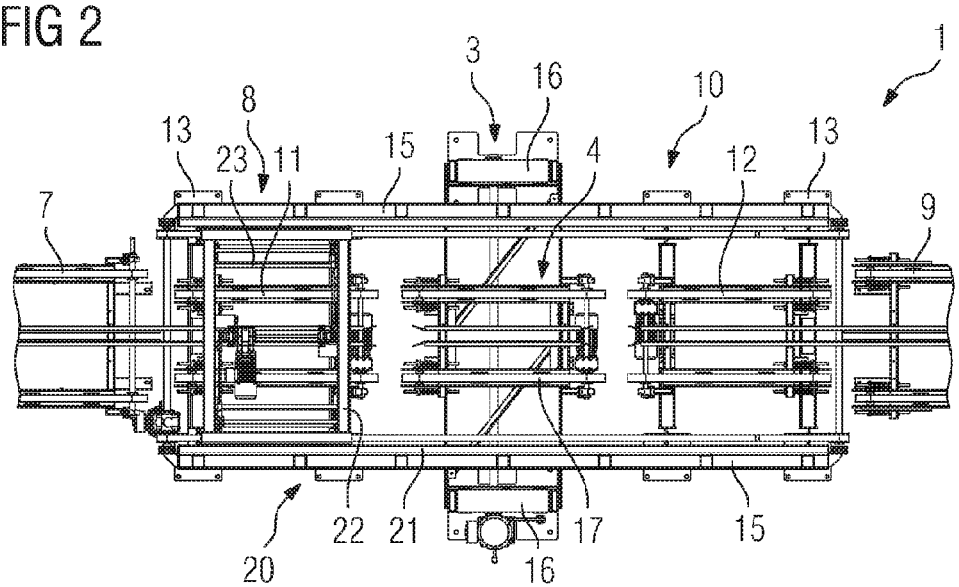
FIG. 2 shows the storage device from FIG. 1 in a view from above.

In accordance with FIGS. 1 and 2 a storage device 1 for stackable containers 2 comprises a lifting conveyor 3 with a movable container receiving device 4 for storing at least one container 2. The container receiving device 4 is able to be moved vertically and continuously between an upper conveyor plane 5 and at least one lower conveyor plane 6 arranged below said upper plane. Arranged in the upper conveyor plane 5 are a feed conveyor 7 for feeding containers 2 to be stored to a receiving position 8 and a discharge conveyor 9 for discharging stored conveyors 2 from a transfer position 10. Likewise arranged in the upper conveyor plane 5 are a receiving conveyor 11 at the receiving position 8 and a transfer conveyor 12 at the transfer position 10, which are borne by two longitudinal supports 15 supported via a support frame 13 on a floor structure 14. The longitudinal supports 15 are aligned horizontally and in parallel to one another. The lifting conveyor 3 is arranged between the receiving position 8 and the transfer position 10 and has vertical struts 16, the lower ends of which stand on the floor structure 14 and the upper ends of which are connected to the longitudinal supports 15. The container receiving device 4 of the lifting conveyor 3 has a transverse conveyor 17, by means of which containers 2 can be accepted on the upper conveying plane 5 by the receiving conveyor 11 or can be transferred to the transfer conveyor 12. On the lower conveying planes 6—only one is shown in the exemplary embodiment for reasons of clarity, but a number of lower conveying planes 6 can also be provided at different conveying levels—a lower transfer conveyor 18 is arranged, on which individual or stacked containers 2 are able to be transferred by the transverse conveyor 17 to the lower conveyor plane 6. Not shown in the diagram, but likewise able to be realized, is a further transfer conveyor on the other side of the transverse conveyor 17. Transport means embodied as a reversible buffer conveyor 19 are also arranged on the lower conveying plane 6, which are intended for dynamic storage of stacked containers 2. These can be arranged as continuation of one of the two transfer conveyors 18. Arranged on the longitudinal supports 15 is a moving device 20 for moving a container 2 on the upper conveying plane 5 between receiving position 8, lifting conveyor 3 and transfer position 10. The moving device 20 has a carriage 22 with controllable gripper elements 23 able to be moved by means of a conveyor system 21 in parallel to the upper conveying plane 5. To move a container 2, the gripper elements 23 are able to be engaged with said container, wherein the container 2 is able to be lifted and lowered again when the elements disengage. In accordance with the invention individual containers 2, which if necessary are deposited on the container receiving device 4 of the lifting conveyor 3 or are stacked one above the other, are transported in the upper conveying plane 5. If the stack of containers 2 on the container receiving device 4 has reached a predeterminable number or height, then in accordance with the invention said stack is transported in the lower conveying plane 6, in the dynamic buffer conveyor 19 or by means of transport vehicles not shown in the diagram, into a stationary container buffer.

FIGS. 3 to 10 illustrate the sequence of movement of the empty containers 2 as well as the operating steps carried out for said movement by the inventive storage device 1.

Figure 3:
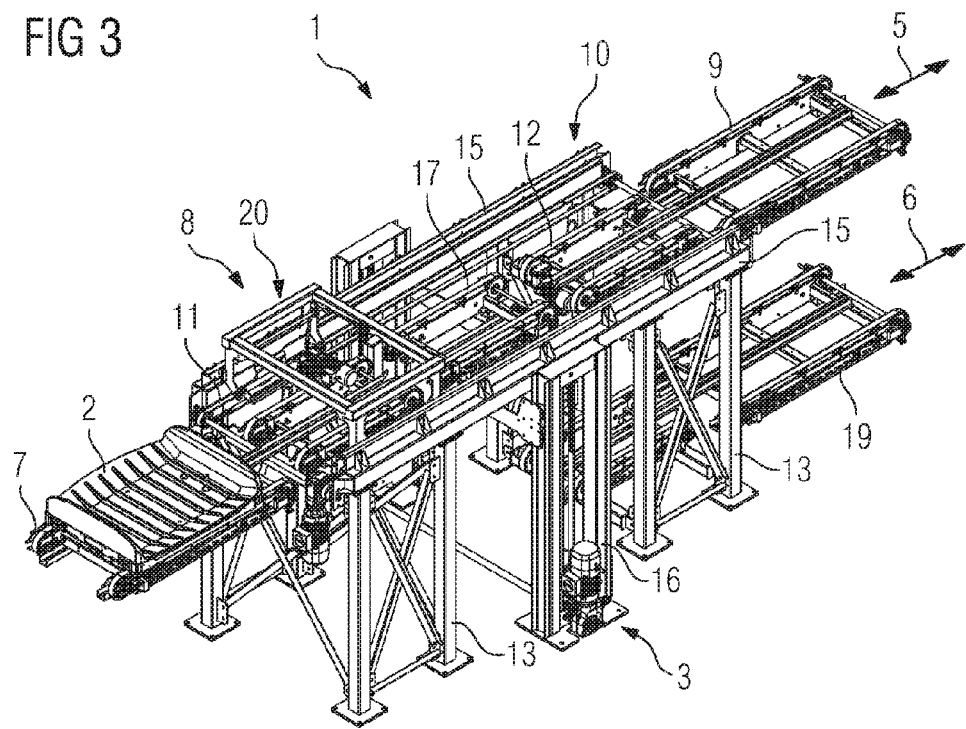
FIG. 3-10 show the storage device from FIGS. 1 and 2 in a perspective view in different stages of the operation to store containers.

A container 2 separated from the conveyed item of luggage at a sorting end point of a sorting conveyor system of an airport and thus empty is fed to the storage device 1 in accordance with FIG. 3 on the upper conveying plane 5 by means of the feeder conveyor 7. If the container 2 is not to be stored, the receiving device 4 of the lifting conveyor 3 is moved upwards, so that feed conveyor 7, receiving conveyor 11, transverse conveyor 17, transfer conveyor 12 and discharge conveyor 9 are connected after one another and form an end-to-end conveyor path on the upper conveyor plane 5. In this way the empty container 2 can be transported directly from the discharge conveyor 9 in the direction of a loading point, for example in the area of luggage check-in of the airport. In this case the moving device 20 remains inactive in the receiving position 8.

Figure 4:
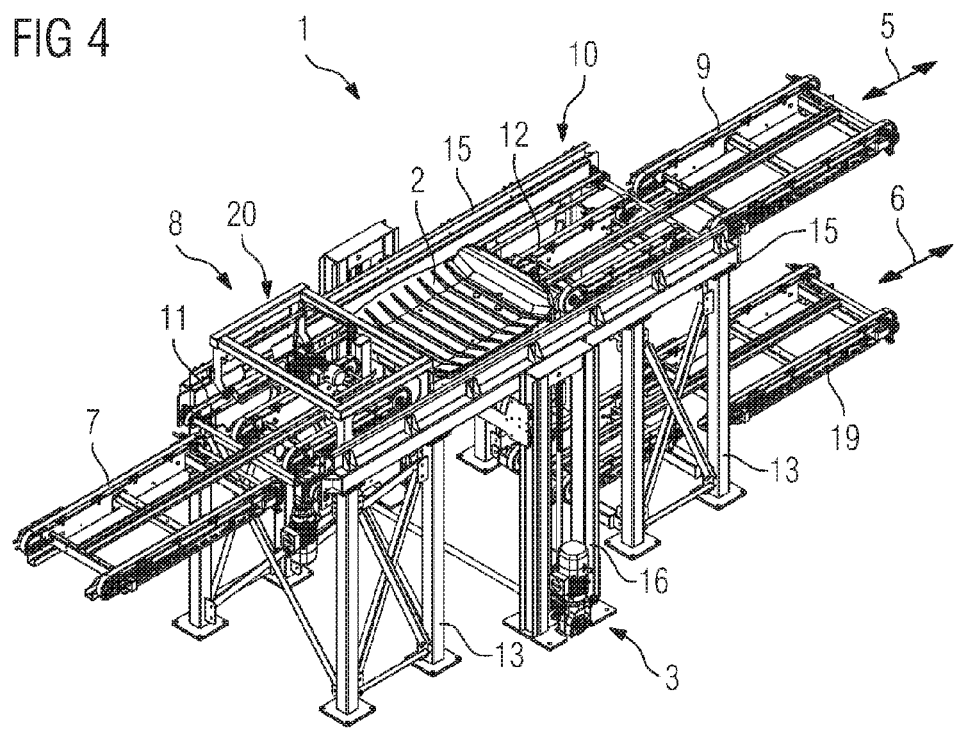
Figure 5:
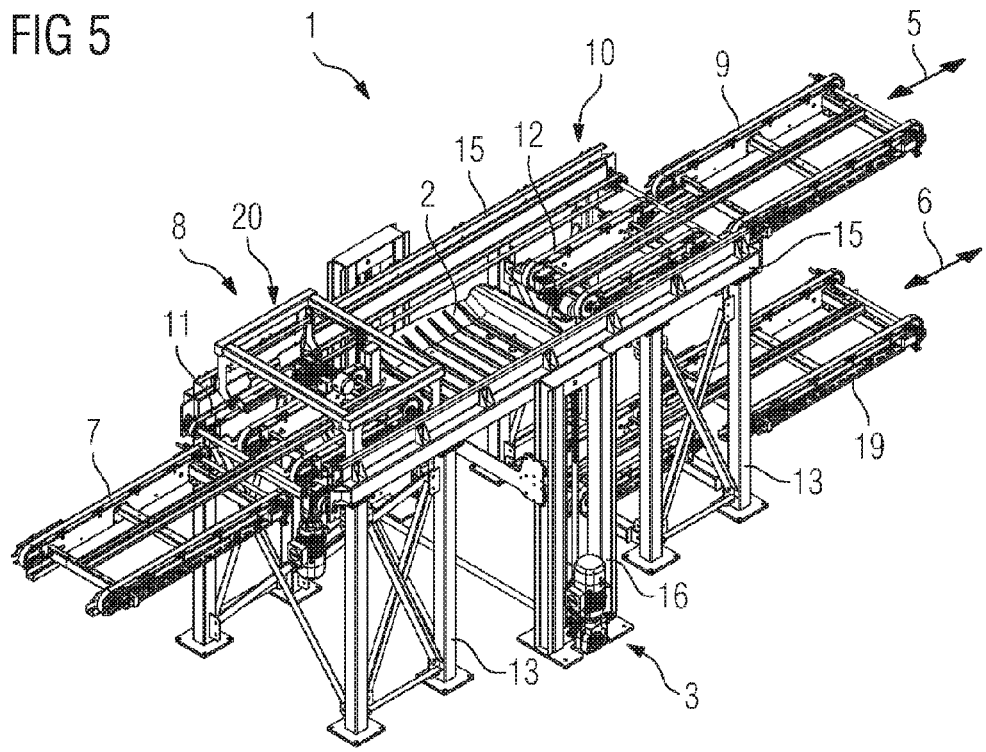

To store empty containers 2, for example during periods of operation in which more empty containers 2 arrive via the feed conveyor 7 than are discharged via the discharge conveyor 9, in accordance with FIG. 4 up to 10 stacks of containers 2 are formed at the container receiving device 4 of the lifting conveyor 3. At the beginning of the stack formation the empty container receiving device 4 of the lifting conveyor 3 is moved upwards, as in FIG. 3. The controller of the storage device 1 stops the container 2 in accordance with FIG. 4, when said container is transported onto the transverse conveyor 17 of the container receiving device 4. Subsequently the container receiving device 4 is transported far enough downwards by the lifting conveyor 3 for the stored container 2 in accordance with FIG. 5 to be lowered below the upper conveying plane 5.

Figure 6:
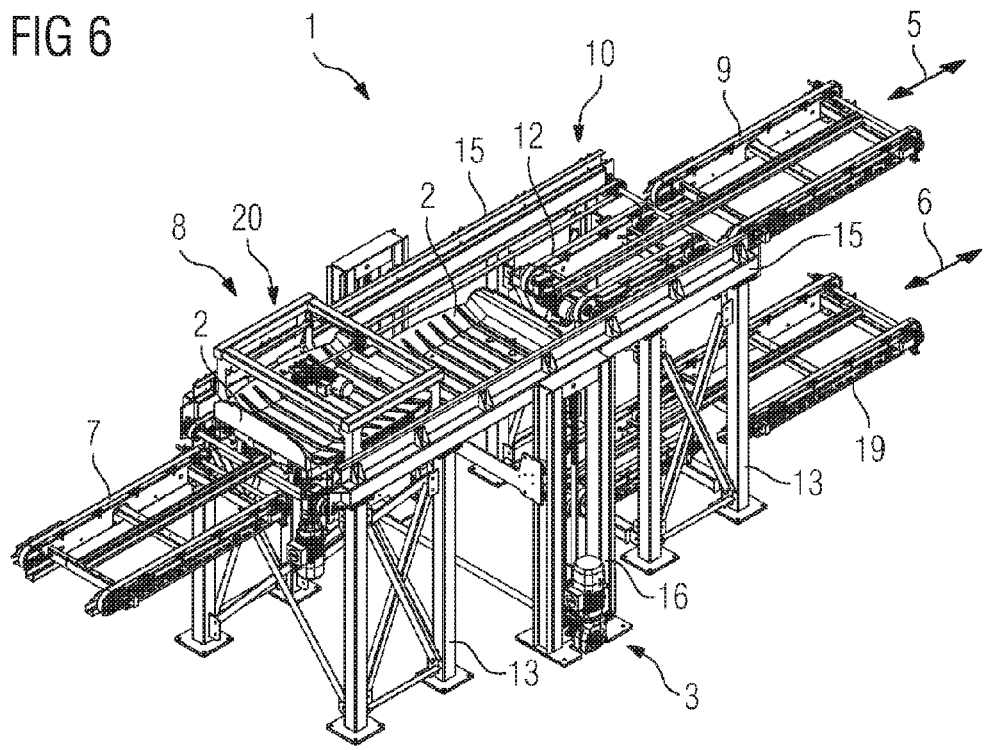
Figure 7:
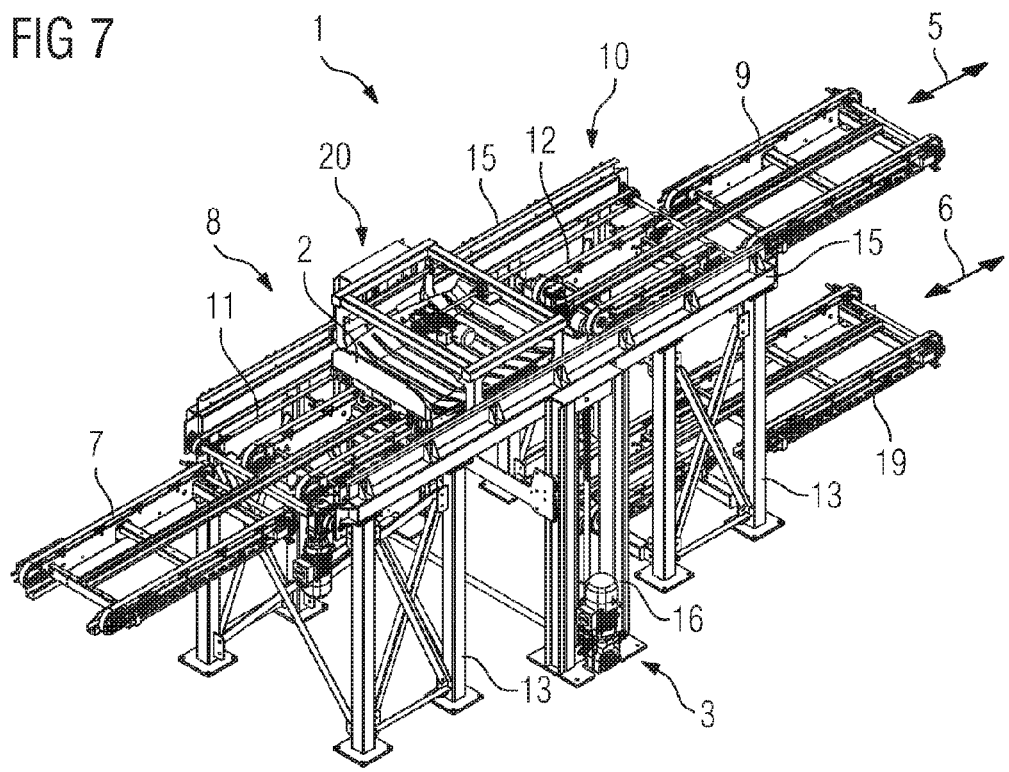
Figure 8:
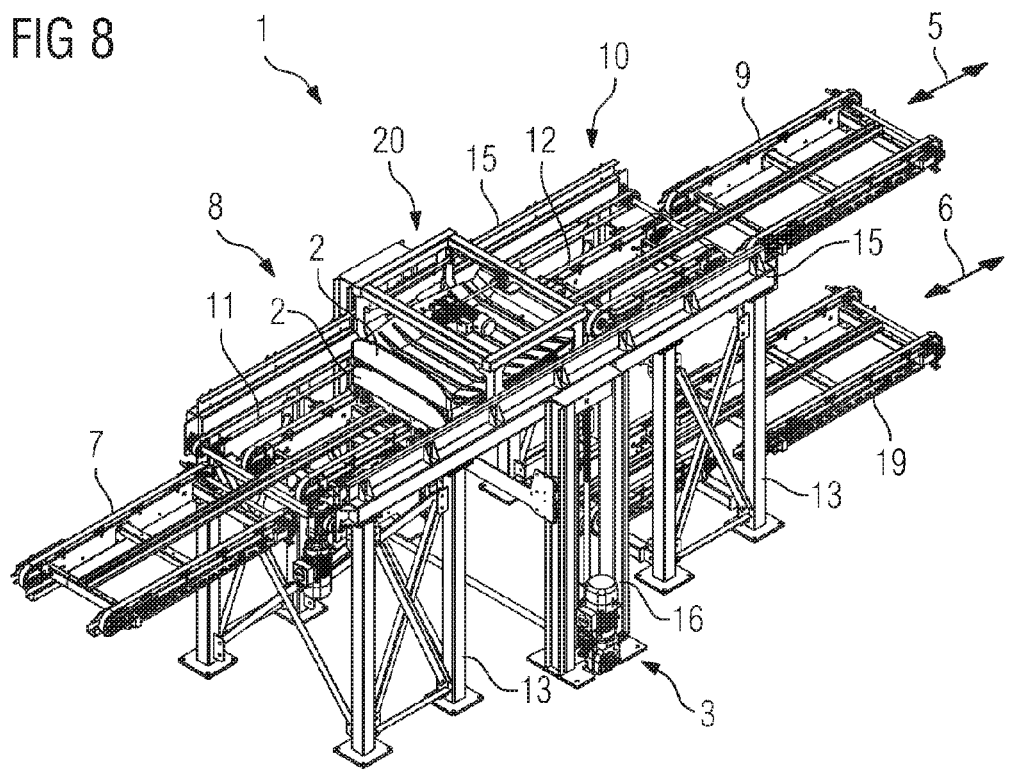
Figure 9:
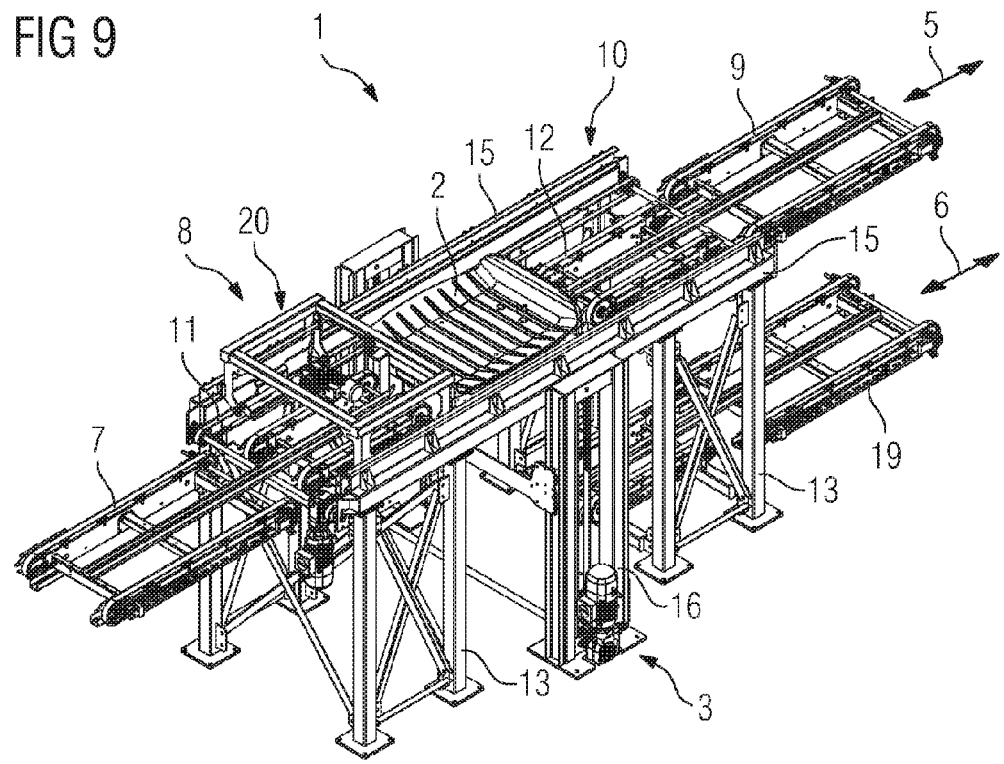
Figure 10:
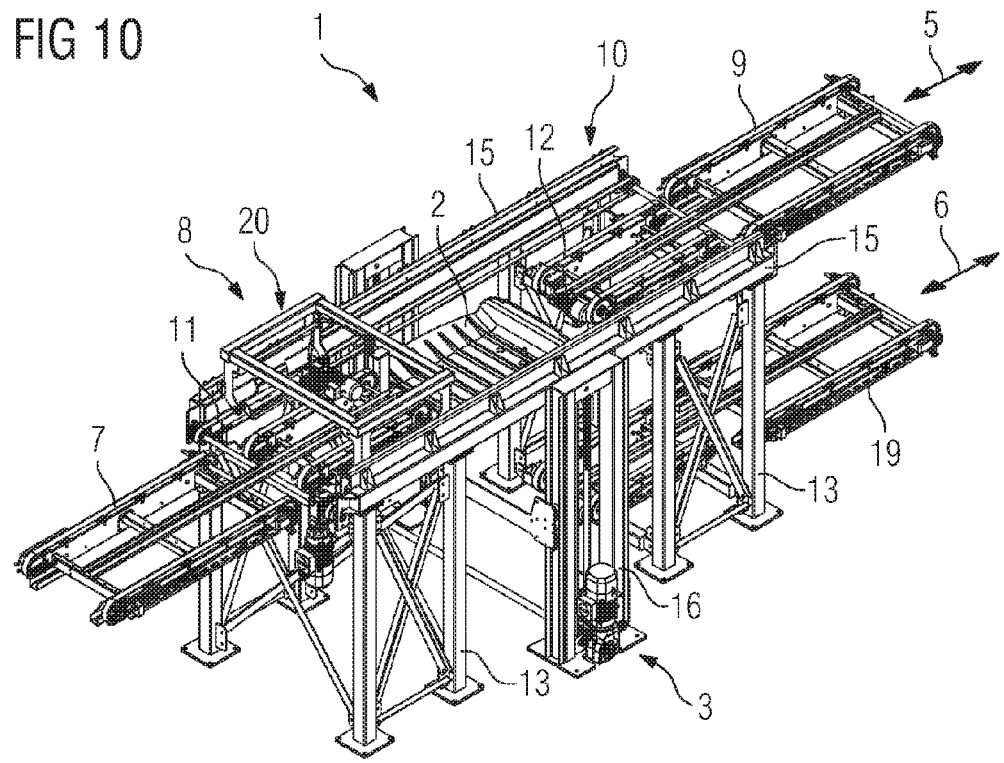

Each further fed container 2 is transported by means of the feed conveyor 7 and the receiving conveyor 11 in accordance with FIG. 6 up to the receiving position 8. There the gripper elements 23 of the moving device 20 are engaged with the further container 2, through which said container is lifted from the receiving conveyor 11. The carriage 22 of the moving device 20 is now moved up to the lifting conveyor 3, through which the further container 2 is transported in accordance with FIG. 7 to the point at which it is arranged above the first container 2 already lying on the receiving device 4. Now the lifting conveyor 3 moves the container receiving device 4 and thus the first container 2 upwards, while the gripper elements 23 of the moving device 20 are disengaged from the further container 2. In accordance with FIG. 8 the further container 2 comes to rest on the first or respectively uppermost container on the container receiving device 4. In this case the shape of the containers 2 is embodied such that these can form a stable stack when on top of one another. In order, when moving the carriage 22 back into the receiving position 8 in accordance with FIG. 9, to avoid a collision between the gripper elements 23 and the stored containers 2, in such cases neither the container receiving device 4 may be moved downwards nor may the gripper elements 23 be moved into the engagement position. In the meantime a further container 2 not shown in the diagram can already have been fed to the receiving position 8. As soon as the carriage 22 is moved out of the area of the lifting conveyor 3, the lifting conveyor 3 moves the container receiving device 4 downwards far enough for the further, now uppermost container 2 of the stack to be lowered in accordance with FIG. 10 to below the upper conveying plane 5.

After a stack of for example four empty containers 2 is formed, the lifting conveyor 3 moves the container receiving device 4 in accordance with FIG. 1 down to the lower conveying plane 6. The stack of containers 2 is transferred by means of the transverse conveyor 17 and the lower transfer conveyor 19 to transport means. The transport means can be embodied as reversible buffer conveyors 19, which dynamically store stacks of conveyors 2. However the transport means can also be embodied as transport vehicles, which transport stacks of containers 2 to static container buffers—such as to trestles.

The stack of containers 2 is unstacked in the reverse order of operating steps for forming the stack and storage, only that the uppermost container 2 of the stack is moved by the moving device 20 from the container receiving device 4 to the transfer position 10 and is deposited there on the transfer conveyor 12.

If the containers 2 are embodied reversibly, then in an advantageous manner the transfer conveyor 12 can be dispensed with and can be formed by the receiving conveyor 11 and the discharge conveyor 9 can be dispensed with and can be formed by the feed conveyor 7.

By the inventive separation of individual containers in the upper conveying plane 5 and a number of stacked containers 2 in the lower conveying plane 6 the access to buffer conveyors 19 or container buffers is decoupled. The storage device 1 can operate in accordance with the principle by which the last container 2 deposited on the stack is that container which is taken from the stack when required. This enables movement sequences to be saved or executed in parallel. Thus it is not necessary to lift the entire stack of containers 2 for example in order to be able to insert a further container 2. The carriage 22 is already moving on into the receiving position 8 while the container receiving device 4 is being moved downwards. The performance of an inventive storage device 1 is far higher than with known devices, the costs are only insignificantly higher.

By the decoupling of the individual conveying planes for individual and stacked containers 2, the buffer tracks can also be designed in accordance with the principle that the last container stack stored is that stack which will be the first withdrawn from the buffer track when required. In this case it is a great advantage that the container stacks do not have to be put back into main stream of the material flow, but only move for the period of stacking or unstacking. This leads to significant savings in energy, wear and maintenance effort, especially if the inventive solution is compared with known solutions in which buffer lines are provided for individual containers or in which individual containers circulate permanently in the conveyor system.

A further advantage also lies in the fact that the inventive storage device can be used equally well for stacking and unstacking, since these processes often do not take place at the same time.

Furthermore the inventive storage device is not only suitable for containers for transporting items of luggage, but for individual items of all types, i.e. also for distribution, mail and package logistics.

Depending on the size of the sorting system a number of inventive storage devices 1 can be connected in parallel in order to increase the throughput performance of empty containers or stacks of containers respectively. Likewise storage devices can be connected behind one another in order to increase the storage capacity for stacks of containers. By suitable parallel connection and connection behind one another of inventive storage devices sorting conveyor systems with predetermined throughput performance and storage capacity can be designed.

The invention claimed is:
1. A storage device for stackable containers for conveying individual items or items of luggage in a sorting conveyor system in an airport, the storage device comprising:
    an upper conveying plane and a lower conveying plane;
    a receiving position and a transfer position;
    a lifting conveyor having a container receiving device being movable between said upper conveying plane and said lower conveying plane, for storing at least one container;

a feed conveyor disposed in said upper conveyor plane for feeding containers to be stored to said receiving position;

a discharge conveyor disposed in said upper conveying plane for discharging containers from said transfer position; and a moving device for moving a container from said receiving position onto said empty container receiving device or onto a respective uppermost container deposited on said container receiving device as well as for moving the container deposited uppermost on said container receiving device to said transfer position;

said moving device including a carriage configured to move parallel to said upper conveying plane, said carriage located above said container receiving device and having controllable gripper elements configured to engage and lift a container.

2. The storage device according to claim 1, which further comprises a transport device, said container receiving device having a transverse conveyor configured to transfer a stack of stored containers on said lower conveying plane between said container receiving device and said transport device.

3. The storage device according to claim 2, wherein said transport device is a reversible buffer conveyor for dynamic storage of container stacks.

4. The storage device according to claim 2, wherein said transport device is a transport vehicle for transporting container stacks between said lifting conveyor and a stationary container buffer.

5. The storage device according to claim 2, wherein said transverse conveyor is configured to transport a container between said receiving position and said transfer position on said upper conveying plane without said moving device.

6. The storage device according to claim 1, wherein the containers are reversible, said discharge conveyor is formed by said feed conveyor and said transfer position is formed by said receiving position.

7. The storage device according to claim 1, which further comprises a control device for controlling said container receiving device of said lifting conveyor by causing said container receiving device to move a container from said receiving position far enough upwards for the container gripped by said moving device to be deposited on said empty container receiving device or to be stacked on the uppermost container stored on said container receiving device.

8. The storage device according to claim 7, wherein said control device is configured to move said container receiving device upwards far enough to permit the uppermost container to be gripped by said moving device in order to move the uppermost container stored on said container receiving device to said transfer position.

* * * * *